Patented Feb. 15, 1949

2,461,841

UNITED STATES PATENT OFFICE 2,461,841

METHOD OF MAKING FIBROUS GLASS ARTICLES

Martin Emery Nordberg, Corning, N. Y., assignor to Corning Glass Works, Corning, N. Y., a corporation of New York No Drawing. Application January 26, 1944, Serial No. 519,831

10 Claims. (Cl. 49—79)

This invention relates to the manufacture of glass fibres and it is particularly concerned with the treatment of glass fibres and fabrics thereof whereby non-siliceous constituents are removed from the fibres by a leaching process to produce highly siliceous fibres and fabrics of novel compositions having improved characteristics.

Recent advances in the art of spinning glass and the development of an ever widening field of uses for woven and unwoven fabrics and textiles of fibrous glass have led to the need for still further improvements in their methods of production and the compositions and physical characteristics of the fibres. The known methods of producing glass fibres economically in large quantities place certain limitations on the types and compositions of glasses which can be employed and thus also on the compositions and physical characteristics of the fibres which can be produced. Glasses which are adapted for the production of articles of relatively large mass, such as utensils of all sorts, electrical insulators, and the like, having the characteristics of high thermal endurance, high chemical durability, high electrical resistance, low power factor, and other desirable properties are often times totally unsuited for spinning into fibres. Some of the causes for such unsuitability are: too high melting temperatures, too high viscosities at the melting temperatures, objectionable alkalinity, tendency to form "slugs" or "shot" in the blowing process, or to break the continuous fibre in the drawing method, etc.

The primary object of this invention is to form glass fibres from compositions which are easy to work and thereafter to convert the fibres to a different composition by leaching out at least some of the fluxes used in melting the glass.

Another object is to produce glass fibres having novel compositions.

Another object is to produce glass fibres of high chemical durability, particularly toward acids.

Another object is to produce glass fibres composed of silica and refractory oxides.

Another object is to produce glass fibres having a high sorptive capacity.

Another object is to produce porous glass fibres.

Another object is to produce porous glass fibres of high silica content.

Another object is to produce porous fibres of practically pure silica which can be revitrified at low temperatures.

Another object is to produce glass fibres and felted and woven fabrics thereof which have heat resisting qualities as good or better than present materials of this form.

Another object is to produce a substitute for asbestos.

Another object is to produce a thermal insulation for high temperature use.

Another object is to improve the electrical properties of glass fibres and fabrics thereof.

Another object is to produce glass fibres and fabrics which are softer to the touch than prior glass fibres and fabrics and which are less irritating to the human skin.

I have found that the leaching of fibrous glass articles to extract non-siliceous constituents thereby changing the composition of the glass and at the same time to produce strong fibrous articles cannot be accomplished in the manner and by the methods heretofore used in the leaching and revitrification of glass articles having relatively large mass, but must conform to the critical requirements and conditions hereinafter set forth. In the first place, the preliminary heat treatment which is ordinarily employed to condition the glass for leaching or to cause a separation or formation of a soluble phase or composition dispersed within the glass mass cannot be employed in treating glass fibres. This is due to the fact that heating the fibres or fibrous materials for the necessary time at any temperature which is effective causes sintering and fusing of the fibres. Unlike massive articles, fibres are chilled almost instantly from a highly liquid to a completely solid state. This time interval is so short that it fails to permit the separation of a soluble phase such as sometimes occurs merely in the normal cooling of massive articles.

In the second place, fibres having a diameter greater than about .001 inch cannot be successfully leached because either they are practically impermeable without a preliminary heat treatment or they crumble and disintegrate on account of breaking stresses set up in the glass during leaching. Fibres which have diameters less than about .001 inch, on the other hand, can be leached successfully because such stresses cannot become serious before the fibre is completely leached through. The use of fibres still smaller in diameter, say about .0003 inch, is advantageous not only because the leaching action is faster and the range of compositions which can be leached is broader than for fibres near .001 inch, but the weaving of fabrics requires the use of the smaller fibres and the leaching and consolidation of woven fabrics is an important feature of my invention, as will appear.

Subject to certain limitations as to composition, both borosilicates and non-borosilicates can be leached in acid solutions to extract non-siliceous constituents when in the form of fibres having diameters less than about .001 inch. In contrast to this, non-borosilicates cannot be leached satisfactorily when in massive form.

Borosilicates which contain more than about 70% $SiO_2$ cannot be leached without a preliminary heat treatment and hence fibres made of such glasses cannot be leached because they cannot be effectively heat treated as pointed out above. On the other hand, fibres composed of borosilicate glass having diameters less than about .001 inch and containing less than about 70% $SiO_2$ leach readily in acid solutions, such as hydrochloric acid.

When the major portion of the non-siliceous constituents of alkali-borosilicate glasses forms water soluble compounds on leaching, such glasses can be leached with water. However, if the alkali content is high, the bath becomes alkaline as leaching proceeds with a resultant attack on the silica structure of the fibres. To overcome this difficulty, acid must be added to the bath. When the alkali to boric oxide ratio is low, say not more than about 1 to 5, the solution will remain essentially neutral and the addition of acid to the bath is unnecessary.

When glass fibres composed of silica, boric oxide, alkali metal oxide, and alumina, and meeting the above stated requirements as to diameter and silica content, are leached with an acid solution, the ultimate composition of the leached fibres is different than that of a massive article of the same glass heat treated and leached in the same manner. An alkali borosilicate containing about 2% $Al_2O_3$, when heat treated and leached in massive form, i. e., in a thickness substantially greater than about .001 inch, has an ultimate composition consisting of over 96% $SiO_2$, about 3% $B_2O_3$, with traces of $Al_2O_3$ and $Na_2O$, but when the same glass in the form of fibres having diameters less than .001 inch is leached in the same manner, the ultimate composition of the fibres consist of over 96% $SiO_2$, about 3% $Al_2O_3$ with traces of $B_2O_3$ and $Na_2O$.

Fibres composed of borosilicate glasses which are substantially free from alkali metal oxides, but which contain substantial amounts of second group oxides and alumina, may also be leached but require an acid solution because the major portion of the non siliceous constituents are practically insoluble in water. The initial glass should contain not more than 56% $SiO_2$, not more than about 22% total second group oxides, not less than about 12% $Al_2O_3$ and at least 5% $B_2O_3$. Such glasses have properties making them particularly suitable for drawing into glass fibres. The resulting fibres after leaching have a high silica content, are free from alkali and contain substantial amounts of alumina, and second group oxides.

Fibres of soda-lime glass or glasses composed of silica, alkali metal oxide, and second group oxide, such as the oxides of beryllium, magnesium, calcium, zinc, strontium, cadmium and barium, and containing not more than about 75% $SiO_2$, leach readily, provided their alkali content is more than about 20%. As the silica content of such glasses is decreased the minimum amount of alkali metal oxide which must be present also may be decreased somewhat.

Fibres having unusual compositions may be produced by means of my invention, by including metal oxides which form acid insoluble components in the resultant glass. For example, glasses composed of silica, alkali metal oxide, and zirconium oxide, the total alkali metal oxide being not less than about 25% and $ZrO_2$ being not more than about 15%, when drawn into fibres having diameters less than .001 inch and leached with an acid solution, produce glasses which consist of silica and zirconia, and containing a trace of alkali metal oxide. For example, a glass consisting of 61.9% $SiO_2$, 28.6% $Na_2O$, and 9.5% $ZrO_2$ was drawn into fibres having diameters less than .001 inch, which were then leached in an aqueous solution of hydrochloric acid and washed in pure water. The fibres were then found to be composed of about 88% $SiO_2$, about 12% $ZrO_2$, and .25% $Na_2O$. Similar results are obtained when titanium and thorium oxides are substituted for zirconium oxide in the above glasses.

In practicing my invention, it is essential that the leaching bath be maintained in a non-alkaline condition, i. e., either neutral or acid. As pointed out above, certain highly acid glasses which contain a large amount of boric oxide, and little or no alkali metal oxide, may be leached with water. In the case of highly basic glasses, such as glasses containing a high percentage of alkali metal oxide or second group oxide, it is desirable to use a strong acid solution. Unless sufficient acid is present in the bath to neutralize all of the basic constituents of the glass, the bath may become alkaline and the silica of the fibres may be dissolved, thereby causing their disintegration.

On account of the small dimensions of the fibres and the small depth to which the leaching action must penetrate in order to permeate the fibres, the leaching time is relatively short but may vary from ten minutes to an hour or more, depending upon the concentration of the acid in the leaching bath and its temperature. The speed of leaching, in general, may be increased by increasing the acid concentration and/or increasing the temperature. When leaching is completed, the fibres should be thoroughly washed with pure water. A leaching time up to several hours is required for compacted masses of fibres or exceedingly thick and tightly woven fabrics, because the diffusion of the solvent into the mass becomes relatively slow.

Glass fibres which have been leached in accordance with the methods described above are porous and have a somewhat lower tensile strength than the original fibres as drawn. I have determined that the pores of the leached fibres are smaller than those occurring in porous glasses which have been leached in massive form. For this reason, despite their smaller capacity, water is more strongly retained in the porous glass fibres than in massive porous glass. I have found that the glass fibres retain about 10% of their weight of water after being heated for several hours at 150° C. A major proportion of this residual water can be removed by more drastic treatment, such as heating at 175° C. in vacuo. The resultant material is a powerful dessicant.

I have discovered that such porous leached glass fibres can be consolidated, i. e., revitrified or converted to non-porous vitreous glass fibres by heating them at temperatures well below the temperatures which are required to consolidate similar porous glasses in massive form. Were it not for this fact, it would be difficult to consolidate the porous fibres without surface devitrification or sintering, which would seriously weaken the resultant fabric. Porous fibres composed of approximately 97% $SiO_2$ and 3% $Al_2O_3$ become consolidated or non-porous when heated for ten minutes at 800° C., or several hours at 600° C. The ability to consolidate at such low temperatures is compatible with the increased surface energy of the porous fibres.

On account of the novel characteristics of such small dimensional glass fibres during leaching and consolidation, I have found it highly advantageous to first form the fibres into the desired woven or unwoven articles before leaching. Felted or woven glass fibres can be leached and consolidated as readily as individual fibres with a great saving in time, materials and overhead costs.

It is customary in the spinning of glass to coat the fibres with a lubricant such as an oil, wax, or other greasy or unctuous material in order to prevent abrasion of the fibres during spinning and during their fabrication into woven or unwoven fabrics. I have found that such coatings do not interfere substantially with my new process and that leaching and revitrification of the fibres can be carried out in their presence. However, an undesirable contamination of the leaching bath ensues and the residue from the organic materials is sometimes difficult to eliminate from the porous fibres during subsequent heat treatment and may cause discoloration of the final fibres. Hence it is usually preferable to remove the coating, either by heating the fabric at about 300° C. or by treating it with a solvent before subjecting it to the leaching operation. As pointed out above, the unusually low temperature at which the porous fibres may be consolidated despite their high silica content permits complete conversion of the fibres of the treated fabrics to a non-porous condition without sintering or fusing the fibres and without undue loss of tensile strength. If desired, the consolidated fibres or fabric may be relubricated or coated with lubricant material after consolidation.

Fibres and fabrics thereof which have been leached and consolidated in accordance with my invention are unique in their texture and softness as compared to ordinary glass fibres and fabrics. The new fabrics are remarkably soft and pliant to the touch and feel more comparable to the fabrics composed of silk or cotton fibres than prior fibrous glass articles. As a result of their high silica content, they also possess the property of considerably higher heat resistance than prior glass fabrics and afford an excellent substitute for asbestos fabrics. The new glass fabric is stable at temperatures above 400° C., at which asbestos dehydrates and disintegrates. Consequently, the new fabric has been found to be very useful as an insulating material for use at temperatures ranging from 400° C. to 1200° C. A further advantage resulting from their composition is the improved electrical resistance and low power factor of the new glass fabrics which together with their increased heat resistance makes them still more desirable for the insulation of wires and electrical conductors which are to be employed under conditions of elevated temperatures, such as the windings of electric motors.

For some purposes it is desirable to omit the step of revitrification and to leave the fibres porous. It has been found that the porous fibres have strong absorptive powers for liquids and vapors. The porous fibres are therefore particularly useful in filters and selective absorption devices for the purification of air and other gases.

I claim:

1. Method of making an article composed of refractory glass fibres which comprises melting a silicate glass containing not more than about 75% $SiO_2$, and at least one additional glass forming oxide of a metal of the second, third or fourth periodic group selected from the class consisting of beryllium, magnesium, calcium, zinc, strontium, cadmium, barium, boron, aluminum, titanium, zirconium, and thorium, forming the glass into fibres having a diameter not exceeding about .001 inch, and fabricating the fibres into an interlaced arrangement to form a fabric, leaching the fabric with an aqueous solvent having a pH not greater than 7 to extract non-siliceous constituents and leave a porous highly siliceous residue.

2. Method of making an article composed of refractory glass fibres which comprises melting a silicate glass containing not more than about 75% $SiO_2$, and at least one additional glass forming oxide of a metal of the second, third or fourth periodic group selected from the class consisting of beryllium, magnesium, calcium, zinc, strontium, cadmium, barium, boron, aluminum, titanium, zirconium, and thorium, forming the glass into fibres having a diameter not exceeding about .001 inch, and fabricating the fibres into an interlaced arrangement to form a fabric, leaching the fabric with an aqueous solvent having a pH not greater than 7 to extract non-siliceous constituents and leave a porous highly siliceous residue, and baking the leached fabric at a temperature sufficient to revitrify the porous fibres but insufficient to cause sintering thereof.

3. Method of making an article composed of refractory glass fibres which consists of the steps of melting a borosilicate glass containing not more than about 70% $SiO_2$, forming the glass into fibres having a diameter not exceeding about .001 inch, fabricating the fibres into an interlaced arrangement to form a fabric, and leaching the fabric with an aqueous solvent having a pH not greater than 7, to extract non-siliceous constituents and leave a porous highly siliceous residue.

4. Method of making an article composed of refratory glass fibres which consists of the steps of melting a borosilicate glass containing not more than about 70% $SiO_2$, forming the glass into fibres having a diameter not exceeding about .001 inch, fabricating the fibres into an interlaced arrangement to form a fabric, and leaching the fabric with an aqueous solvent having a pH not greater than 7, to extract non-siliceous constituents and leave a porous highly siliceous residue, and baking the leached fabric at a temperature sufficient to revitrify the porous fibres but insufficient to cause sintering thereof.

5. Method of making an article composed of refractory glass fibres which comprises melting a borosilicate glass containing not more than about 56% $SiO_2$, not more than about 22% total oxides of the elements of the second periodic group, not less than about 12% $Al_2O_3$, and at least 5% $B_2O_3$, said glass being substantially free of other elements forming the glass into fibres having a diameter not exceeding about .001 inch, fabricating the fibres into an interlaced arrangement to form a fabric, and leaching the fabric with an acid solution, to extract non-siliceous constituents and leave a porous highly siliceous residue.

6. Method of making an article composed of refractory glass fibres which comprises melting a borosilicate glass containing not more than about 56% $SiO_2$, not more than about 22% total oxides of the elements of the second periodic group, not less than about 12% $Al_2O_3$, and at least 5% $B_2O_3$, said glass being substantially free of other elements forming the glass into fibres having a diameter not exceeding about .001 inch, fabricating the fibres into an interlaced arrangement to form a fabric, and leaching the fabric with an acid solution, to extract non-siliceous constituents and leave a porous highly siliceous residue, and baking the leached fabric at a temperature sufficient to revitrify the porous fibres but insufficient to cause sintering thereof.

7. Method of making an article composed of refractory glass fibres, which comprises melting a glass consisting of silica, alkali metal oxide and zirconium oxide, the total alkali metal oxide being not less than about 25% and the zirconium oxide being not more than about 15%, forming the glass into fibres having a diameter not exceeding about .001 inch, fabricating the fibres into an interlaced arrangement to form a fabric, and leaching the fabric with an acid solution to extract non-siliceous constituents and leave a porous highly siliceous residue.

8. Method of making an article composed of refractory glass fibres, which comprises melting a glass consisting of silica, alkali metal oxide and zirconium oxide, the total alkali metal oxide being not less than about 25% and the zirconium oxide being not more than about 15%, forming the glass into fibres having a diameter not exceeding about .001 inch, fabricating the fibres into an interlaced arrangement to form a fabric, and leaching the fabric with an acid solution to extract non-siliceous constituents and leave a porous highly siliceous residue, and baking the leached fabric at a temperature sufficient to revitrify the porous fibres but insufficient to cause sintering thereof.

9. The method which comprises treating a fabric composed of glass fibres having a diameter of about .001" which contain not more than about 75% $SiO_2$ and at least two other glass forming oxides, at least one of said oxides being of a metal of the second, third or fourth periodic group selected from the class consisting of beryllium, magnesium, calcium, zinc, strontium, cadmium, barium, boron, aluminum, titanium, zirconium and thorium, with an aqueous solvent having a pH not greater than 7 to extract non-siliceous constituents and leave a porous, highly siliceous residue.

10. The method which comprises treating a fabric composed of glass fibers having a diameter of about .001" which contain not more than about 75% $SiO_2$ and at least two other glass forming oxides, at least one of said oxides being of a metal of the second, third or fourth periodic group selected from the class consisting of beryllium, magnesium, calcium, zinc, strontium, cadmium, barium, boron, aluminum, titanium, zirconium and thorium, with an aqueous solvent having a pH not greater than 7 to extract non-siliceous constituents and leave a porous, highly siliceous residue and baking the treated fabric at a temperature sufficient to revitrify the porous fibres but insufficient to cause sintering thereof.

MARTIN EMERY NORDBERG.

REFERENCES CITED

The following references are of record in the file of this patent:

UNITED STATES PATENTS

| Number | Name | Date |
|---|---|---|
| 1,721,979 | Taylor | July 23, 1929 |
| 2,184,320 | Simpson | Dec. 26, 1939 |
| 2,215,039 | Hood et al. | Sept. 17, 1940 |
| 2,221,709 | Hood et al. | Nov. 12, 1940 |
| 2,286,275 | Hood et al. | June 16, 1942 |
| 2,338,463 | Skaupy et al. | Jan. 4, 1944 |
| 2,339,928 | Hood | Jan. 25, 1944 |

FOREIGN PATENTS

| Number | Country | Date |
|---|---|---|
| 504,883 | Great Britain | May 2, 1939 |